(12) United States Patent
Erben

(10) Patent No.: US 10,538,304 B2
(45) Date of Patent: Jan. 21, 2020

(54) AIRCRAFT DOOR ASSEMBLY

(71) Applicant: Airbus Operations GmbH, Hamburg (DE)

(72) Inventor: Johann Konrad Erben, Hamburg (DE)

(73) Assignee: Airbus Operations GmbH (DE)

( * ) Notice: Subject to any disclaimer, the term of this patent is extended or adjusted under 35 U.S.C. 154(b) by 554 days.

(21) Appl. No.: 15/344,724

(22) Filed: Nov. 7, 2016

(65) Prior Publication Data
US 2017/0129585 A1 May 11, 2017

(30) Foreign Application Priority Data
Nov. 10, 2015 (EP) .................................. 15193810

(51) Int. Cl.
*B64C 1/14* (2006.01)
*E05B 17/20* (2006.01)
*E05B 79/10* (2014.01)
*E05B 83/42* (2014.01)
*E05C 3/12* (2006.01)
*E05C 9/00* (2006.01)
*E05C 19/12* (2006.01)

(52) U.S. Cl.
CPC ............ *B64C 1/1461* (2013.01); *B64C 1/143* (2013.01); *E05B 17/2007* (2013.01); *E05B 79/10* (2013.01); *E05B 83/42* (2013.01); *E05C 3/12* (2013.01); *E05C 9/00* (2013.01); *E05C 19/12* (2013.01)

(58) Field of Classification Search
CPC ..... B64C 1/1407; B64C 1/143; B64C 1/1461; E05B 15/0086; E05B 17/2007; E05B 17/2034; E05B 79/10; E05B 83/42; E05C 19/12; E05C 3/02; E05C 3/12; E05C 9/00
See application file for complete search history.

(56) References Cited

U.S. PATENT DOCUMENTS 2,345,512 A * 3/1944 Treptow ............... B61D 19/005
  105/424
2,445,131 A * 7/1948 Wartian ................ B64C 1/1407
  244/129.5

(Continued)

FOREIGN PATENT DOCUMENTS

EP 0105082 A2 4/1984

OTHER PUBLICATIONS

Search Report dated Feb. 23, 2016 (EP15193810.7).

*Primary Examiner* — Medhat Badawi
(74) *Attorney, Agent, or Firm* — Lerner, David, Littenberg, Krumholz & Mentlik, LLP

(57) ABSTRACT

A door assembly, particularly for doors of passenger aircraft, includes a door frame, a door having a door body hingedly installed in the door frame, at least one hooking pintle attached to the door frame or an edge of the door body extending along a pintle axis, and at least one door latch connected to an edge of the door body or the door frame, respectively, the door latch having a substantially C-shaped latch body configured to rotate around an axis parallel to the pintle axis of the hooking pintle. The door assembly further includes a bistable latch and hook mechanism configured to catch the door latch in hooking engagement with the hooking pintle and to retain the door latch in a direction perpendicular to the door body in an overcenter position.

14 Claims, 2 Drawing Sheets

(56) References Cited

U.S. PATENT DOCUMENTS

| | | | | | |
|---|---|---|---|---|---|
| 2,519,386 | A | * | 8/1950 | Loving | B64C 1/32 244/129.5 |
| 2,857,629 | A | * | 10/1958 | Walter | E06B 3/4654 49/372 |
| 3,131,892 | A | * | 5/1964 | Salmun | B64C 1/14 244/129.5 |
| 3,869,102 | A | * | 3/1975 | Carroll | B64C 39/02 244/118.1 |
| 3,927,709 | A | * | 12/1975 | Anderson | E05D 15/24 160/116 |
| 4,125,235 | A | * | 11/1978 | Fitzgerald | B64C 1/143 244/129.5 |
| 4,176,812 | A | * | 12/1979 | Baker | B64C 1/1407 182/77 |
| 4,185,799 | A | * | 1/1980 | Richards, Jr. | B64C 1/20 244/118.5 |
| 4,199,120 | A | * | 4/1980 | Bergman | B64C 1/1407 244/129.5 |
| 4,375,876 | A | * | 3/1983 | Stewart | B64C 1/1438 160/201 |
| 4,395,000 | A | * | 7/1983 | Deviny | B64C 1/1415 244/118.3 |
| 4,470,566 | A | * | 9/1984 | Fitzgerald | B64C 1/1407 244/129.1 |
| 4,482,113 | A | * | 11/1984 | Backlund | B64C 1/1407 244/129.5 |
| 4,510,714 | A | * | 4/1985 | Kasper | B64C 1/1415 244/129.5 |
| 4,635,883 | A | * | 1/1987 | Hamilton | B64D 9/00 244/137.1 |
| 4,758,030 | A | * | 7/1988 | Kupfernagel | B64C 1/1415 244/129.5 |
| 4,911,219 | A | * | 3/1990 | Dalrymple | B61D 17/20 160/118 |
| 4,944,473 | A | * | 7/1990 | Kallies | B64C 1/1407 244/129.5 |
| 4,989,808 | A | * | 2/1991 | Spraggins | B64C 1/1407 244/118.5 |
| 5,031,863 | A | * | 7/1991 | Noble | B64C 1/1407 244/129.5 |
| 5,064,147 | A | * | 11/1991 | Noble | B64C 1/1407 244/129.5 |
| 5,181,677 | A | * | 1/1993 | Kaplan | B64C 1/1438 244/129.4 |
| 5,259,576 | A | * | 11/1993 | Howard | B64C 1/1438 244/129.4 |
| 5,303,508 | A | * | 4/1994 | Porte | B64C 1/1446 123/41.04 |
| 5,305,969 | A | * | 4/1994 | Odell | B64C 1/1407 244/129.5 |
| 5,547,130 | A | * | 8/1996 | Davies | F02K 1/766 239/265.29 |
| 5,636,814 | A | * | 6/1997 | Rollert | B64C 1/1407 192/71 |
| 5,735,557 | A | * | 4/1998 | Harvey | F02K 1/766 239/265.29 |
| 5,823,473 | A | * | 10/1998 | Odell | B64C 1/1415 244/129.4 |
| 5,833,300 | A | * | 11/1998 | Russke | B60J 7/145 296/108 |
| 5,931,415 | A | * | 8/1999 | Lingard | B64C 1/143 244/129.4 |
| 5,953,904 | A | * | 9/1999 | Mountney | F02K 1/766 239/265.29 |
| 6,109,563 | A | * | 8/2000 | Verhoeven | B64C 1/143 244/129.5 |
| 6,139,073 | A | * | 10/2000 | Heffner | E05B 81/14 292/201 |
| 6,145,786 | A | * | 11/2000 | Baudu | E05C 3/24 244/110 B |
| 6,186,444 | B1 | * | 2/2001 | Steel | B64C 1/1423 160/118 |
| 6,189,833 | B1 | * | 2/2001 | Ambrose | B64C 1/1407 244/118.3 |
| 6,345,786 | B1 | * | 2/2002 | Sakurai | B64C 25/16 244/100 R |
| 6,352,221 | B1 | * | 3/2002 | Sakurai | B64C 25/16 244/102 R |
| 6,691,953 | B2 | * | 2/2004 | Leclerc | B64C 1/1407 244/129.5 |
| 6,811,118 | B2 | * | 11/2004 | Collet | B64C 25/26 244/102 A |
| 6,823,927 | B2 | * | 11/2004 | Steel | E05D 3/022 16/49 |
| 7,146,796 | B2 | * | 12/2006 | Lair | E05B 47/0607 60/226.2 |
| 7,275,717 | B2 | * | 10/2007 | Landry | B64C 1/1415 244/129.5 |
| 7,290,736 | B2 | * | 11/2007 | Pahl | B64C 1/1407 244/129.5 |
| 7,360,803 | B2 | * | 4/2008 | Parent | E05B 81/14 292/117 |
| 7,546,666 | B2 | * | 6/2009 | Malchow | B65D 90/0006 206/504 |
| 7,654,488 | B2 | * | 2/2010 | Obst | B64C 1/1407 244/129.4 |
| 7,744,035 | B2 | * | 6/2010 | Saint-Jalmes | B64D 11/003 244/118.5 |
| 7,832,686 | B2 | * | 11/2010 | Erben | B64C 1/14 16/366 |
| 7,883,058 | B2 | * | 2/2011 | Erben | B64C 1/14 16/366 |
| 7,959,195 | B2 | * | 6/2011 | Harvey | B64C 25/26 292/130 |
| 8,038,100 | B2 | * | 10/2011 | Osborne | B64D 11/0023 244/129.5 |
| 8,047,583 | B2 | * | 11/2011 | Clausen | B64C 1/1407 244/129.1 |
| 8,070,102 | B2 | * | 12/2011 | Kobayashi | B64C 1/1438 244/129.4 |
| 8,201,777 | B2 | * | 6/2012 | Wilson | B64C 1/1415 244/129.5 |
| 8,360,483 | B2 | * | 1/2013 | Koppel | E05B 83/16 292/216 |
| 8,398,026 | B2 | * | 3/2013 | Walton | B64D 1/06 244/102 R |
| 8,434,720 | B2 | * | 5/2013 | Depeige | B64C 1/1407 244/129.5 |
| 8,468,953 | B2 | * | 6/2013 | Ahrens | B61D 17/06 105/1.1 |
| 8,740,148 | B2 | * | 6/2014 | Risch | B64C 1/1461 244/129.5 |
| 8,833,700 | B2 | * | 9/2014 | Klaas | B64C 1/1407 244/129.5 |
| 9,145,710 | B2 | * | 9/2015 | Weinerman | E05B 15/102 |
| 9,567,059 | B2 | * | 2/2017 | Scimone | B64C 1/1407 |
| 9,592,902 | B2 | * | 3/2017 | Perkins | B64C 1/1423 |
| 9,708,051 | B2 | * | 7/2017 | Voss | B64C 1/066 |
| 9,957,045 | B1 | * | 5/2018 | Daly | B64C 37/02 |
| 10,124,884 | B2 | * | 11/2018 | Walke | B64C 25/26 |
| 2004/0148865 | A1 | * | 8/2004 | Duncan | E05B 1/0015 49/415 |
| 2007/0045471 | A1 | * | 3/2007 | Erben | B64C 1/14 244/129.4 |
| 2007/0045472 | A1 | * | 3/2007 | Erben | B64C 1/14 244/129.5 |
| 2008/0217475 | A1 | * | 9/2008 | Allison | B64D 11/00 244/114 R |
| 2009/0173825 | A1 | * | 7/2009 | Dehn | B64C 1/1438 244/129.5 |
| 2011/0036941 | A1 | * | 2/2011 | Cazals | B64C 3/38 244/46 |
| 2013/0318873 | A1 | * | 12/2013 | Knijnenburg | B64C 1/1407 49/31 |
| 2014/0075863 | A1 | * | 3/2014 | Laronde | E06B 1/045 52/217 |
| 2014/0117161 | A1 | * | 5/2014 | Harter | B64D 11/0023 244/129.5 |

(56) References Cited

U.S. PATENT DOCUMENTS

| | | | |
|---|---|---|---|
| 2014/0175215 A1* | 6/2014 | Gallant | B64D 11/00 244/36 |
| 2015/0108275 A1* | 4/2015 | Pothier | E05B 77/36 244/129.5 |
| 2015/0210373 A1* | 7/2015 | Guimont | B64C 1/1469 244/129.5 |
| 2016/0144944 A1* | 5/2016 | Goings | B64D 11/0023 244/129.5 |
| 2016/0245006 A1* | 8/2016 | Joussellin | E05D 15/0621 |
| 2016/0298370 A1* | 10/2016 | Druckman | B64D 11/0606 |
| 2017/0043857 A1* | 2/2017 | Seibt | B64C 1/1407 |
| 2017/0129585 A1* | 5/2017 | Erben | B64C 1/143 |
| 2017/0183077 A1* | 6/2017 | Cazals | B64C 1/1415 |
| 2017/0274975 A1* | 9/2017 | Bobaru | B64C 1/1469 |

* cited by examiner

AIRCRAFT DOOR ASSEMBLY

FIELD OF THE INVENTION

The present invention relates to a door assembly, specifically for outwardly opening plug-type or hinge-type aircraft doors, for example for use as overwing exits (OWE) in passenger aircraft.

Although the invention is explained and discussed in conjunction with a hinge-type aircraft door, the principles of the invention may easily be transferred to other types doors as well, for example coach doors, trolleybus doors, train doors, freight containers, isolating doors for refrigerating chambers or vehicles or similar.

BACKGROUND OF THE INVENTION

Self-sealing doors such as coach doors, trolleybus doors, train doors, isolating doors for refrigerating chambers or vehicles or aircraft doors may employ so-called plug-type doors which are designed to seal itself in the door frame by taking advantage of a pressure difference, for example between an aircraft cabin on the inside and the atmosphere around the aircraft in flying altitude on the outside. The pressurization forces the door body into the door frame which may be inversely wedge-shaped or which may include stop members at or around the door jamb that match corresponding door stop members arranged around the outer circumference of the door body. The higher pressure on the inside exerts a force onto the seating of the door body within the door frame or onto the bearing surfaces of the corresponding stop members and retains the door within the door frame, preventing the door from springing open until after release of the pressure or other active deployment of the door.

Those pressure-induced loads need to be redirected into the door frame and, subsequently, into the surrounding structures, such as the fuselage of an aircraft. Since the pressure-induced loads act substantially perpendicularly to the door body, for example from within the aircraft towards outboard of the aircraft, a conventional door structure may include bearing members in the form of rails or beams at the door jamb that may be spaced apart in different horizontal planes along the width of the door body and fixedly connected to the fuselage structure.

Document U.S. Pat. No. 5,636,814 A discloses an aircraft door structure having a clutch for an interior latch linkage of a plug-type door. The clutch is secured by an over-center mechanism to ensure that forces acting in opening direction on the latch will keep the latch at a fixed stop. Document U.S. Pat. No. 5,823,473 A discloses a latch-lock mechanism for an airplane cargo door including straight-through drive shafts rotated by a common powered drive unit, and pull-in hooks co-acting with pull-in pins affixed to the fuselage of the airplane adjacent to the sides of the cargo door opening to pull the cargo door into a closed position.

SUMMARY OF THE INVENTION

There is, however, a need for improvements in door structures, particularly for aircraft, which require less installation space and are more convenient in operation, while at the same time retaining the ability to effectively transfer pressure-induced loads into the surrounding door frame structures.

A first aspect of the disclosure thus pertains to a door assembly comprising a door frame, a door having a door body hingedly installed in the door frame, at least one hooking pintle attached to the door frame or an edge of the door body extending along a pintle axis, and at least one door latch connected to an edge of the door body or the door frame, respectively, the door latch having a substantially C-shaped latch body configured to rotate around an axis parallel to the pintle axis of the hooking pintle. The door assembly further comprises a bistable latch and hook mechanism configured to catch the door latch in hooking engagement with the hooking pintle and to retain the door latch in a direction perpendicular to the door body in an overcenter position.

According to a second aspect of the disclosure, an aircraft comprises a door assembly according to the first aspect of the disclosure, particularly for an overwing exit of the aircraft.

According to a third aspect of the disclosure, a method for operating a door assembly, particularly a door assembly according to the first aspect of the disclosure of an aircraft according to the second aspect of the disclosure, comprises rotating the latch body from the overcenter position of the bistable latch and hook mechanism to a deadcenter position of the bistable latch and hook mechanism around the hooking pintle in at least partially deeper hooking engagement with the hooking pintle, and rotating the latch body over the deadcenter position in the opposite direction around the hooking pintle out of the hooking engagement with the hooking pintle again.

One of the ideas on which the present invention is based is to provide a latch and hook mechanism for a door body within a door frame that has a latch connected to the door body engage with a hooking pintle connected to the door frame (or vice versa). The latch and hook mechanism essentially blocks an outboard linear motion of the latch perpendicular to the door body, but in principle allows for a rotating movement of the latch around an axis collinear or at least parallel with the hooking pintle. By providing a bistable latch and hook mechanism with an overcenter position for the latch, any force acting in outboard direction will not be able to move the latch out of the hooking engagement with the hooking pintle in its overcenter position. In order to unlatch the latch and hook mechanism, the bistable latch and hook mechanism will first need to be brought in a direction opposite to the outboard direction into a deadcenter position where the latch is actually brought even deeper into hooking engagement with the hooking pintle. This ensures that the latch and hook mechanism will only unhook, if a counterforce to the pressure-induced loads acting on the door will be actively exerted on the door assembly, so that the door assembly will be innately secure against accidental unlatching by normally occurring loads.

According to an embodiment of the door assembly, the bistable latch and hook mechanism may include a latch lever fixedly connected to the latch body and protruding outwardly from the C-shaped latch body, and a bistable latch linkage hingedly connecting the latch lever to the door body or the door frame, the bistable latch linkage having a spring-actuated overcenter position in which the door latch is biased in hooking engagement with the hooking pintle.

According to a further embodiment of the door assembly, the latch linkage may comprise a kinematic chain of a 2-bar linkage with a centre joint. In a further embodiment, the door assembly may further comprise a latch linkage stop member fixedly connected to the door body and configured to unidirectionally block the centre joint of the 2-bar linkage in the overcenter position. Particularly, the latch linkage stop member may be configured to unidirectionally block the centre joint of the 2-bar linkage in a direction perpendicular to the door body. Such an overcenter lock is an advantageous mechanism for limiting travel of the 2-bar linkage in one direction so that it can just pass the centreline between the end pivots. Particularly advantageous is the fact that the overcenter position guarantees a higher locking force, the more linear counterforce is applied to the linkage. An unlatching motion may then simply involve moving the center point to the opposite side of the stop member, thereby cause in the innate weight acting on the 2-bar linkage to easily force the overcenter lock open.

According to an alternative embodiment, the latch and hook mechanism may be inherently included in the latch body. To this end, the latch and hook mechanism may include a pawl attached to and protruding outwardly from an inner surface of the C-shaped the latch body facing towards the hooking pintle. The pawl may in some embodiments be integrally formed with the latch body. The C-shaped latch body may then be configured to rotate around an axis that is laterally displaced with respect to the shaft axis of the hooking pintle and to laterally shift towards the shaft axis of the hooking pintle upon engagement of the pawl with the hooking pintle when rotating out of the overcenter position. This configuration is very easy to implement since it does not involve complicated kinematic chains for the latch and hook mechanism. The latch and hook mechanism in this case behaves as a kind of "soft ratchet" where the back movement of the pawl in the counter clockwise direction is not entirely blocked, but is biased by the inward movement of the door body in deeper engagement with the door frame.

According to other embodiments of the door assembly, the door latch may further comprise an arresting notch formed off-center to the latch fulcrum. In one embodiment, the door assembly may comprise a detent having a detent pivot engaging with the arresting notch of the door latch in a locked position. In a particular embodiment, a detent linkage is then fixedly connected to the detent and configured to swivel the detent pivot in and out of engagement with the arresting notch of the door latch. Such a detent linkage may advantageously also comprise a kinematic chain of a 2-bar linkage with a centre joint, similar to the latch linkage.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
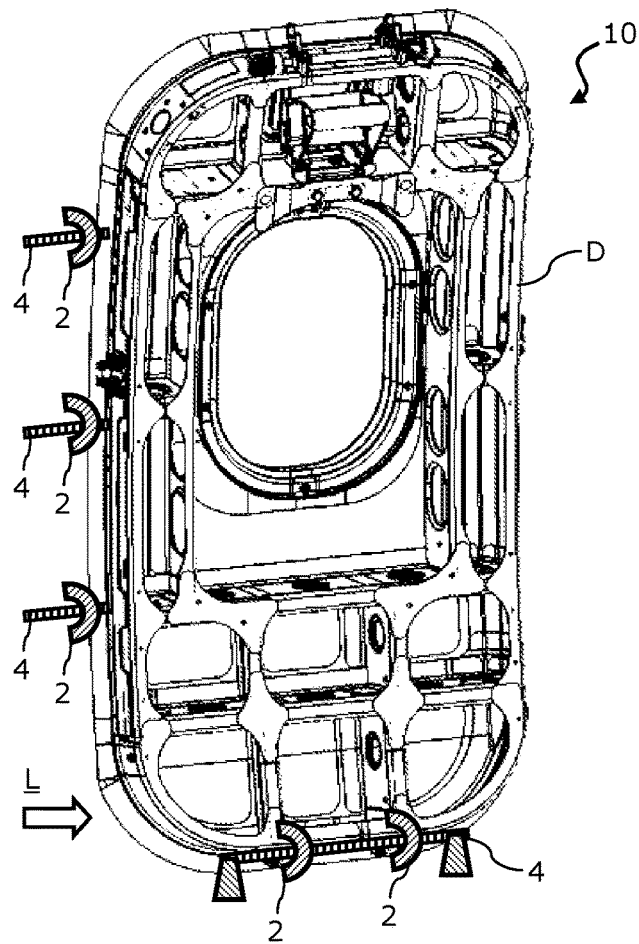
FIG. 1 schematically illustrates a door body of an aircraft door assembly according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

The following detailed explanation is directed towards door assemblies for use in aircraft, such as overwing exits (OWE) in passenger aircraft, but the guiding principles of the invention may be used for other applications as well, such as door assemblies for coaches, trolleybuses, trains, freight containers or isolating doors for refrigerating chambers or vehicles.

Figure 10:
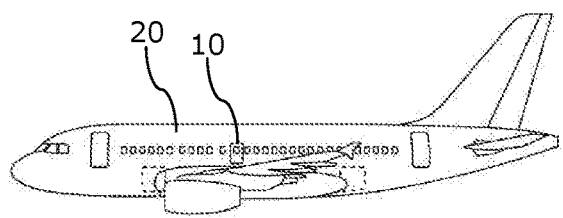
FIG. 10 schematically illustrates an aircraft having at least one aircraft door assembly according to yet a further embodiment of the invention.

FIG. 1 shows a schematic illustration of a door assembly 10 as it may be employed in an aircraft, particularly a passenger aircraft. The view on the door assembly 10 is exemplarily shown as seen from the inside of a cabin in a passenger aircraft. FIG. 10 exemplarily depicts an aircraft 20 comprising such a door assembly 10 as explained and described in conjunction with FIGS. 1 to 8. The door assembly 10 may be used as overwing exit (OWE) in passenger aircraft, but it may be equally possible to equip other exits of the aircraft 20 with the door assemblies 10 as well.

The door assembly 10 generally includes a door D having a door body which may be hinged on the top side to provide for an outwardly opening door within a door frame of the door assembly 10. The upper hinge on the top side may be spring-loaded against the door frame and may be designed to take a portion of the loads in outboard direction, but no circumferential or fuselage loads. The pivoting motion of the outwardly opening door D around the top side hinge may be power assisted by means of suitable hydraulically, pneumatically and/or electrically driven actuators that may be designed to provide enough power to keep the door in operation for a minimum of time, such as for example for at least two seconds, even under adverse conditions.

To secure the door D in its closed state, for example during flight, taxi, take-off and/or landing of the aircraft, the door D may be equipped with one or more door latches 2 on the bottom edge. For purposes of illustration, only bottom side door latches 2 and side edge door latches 2 on the left hand side are schematically illustrated in FIG. 1, however, it should be understood that side edge door latches 2 on either or both side edges of the door D may be arranged additionally or alternatively in an analogous manner. It may also be possible to equip the door D only with side edge door latches 2 while omitting the bottom side door latches 2 or to equip the door D only with bottom side door latches 2 while omitting the side edge door latches 2. The number of door latches 2 is only exemplarily shown as two for the bottom side door latches 2 and with three for the side edge door latches 2, but there may be any other number of door latches 2 provided, depending on application, size, weight and security level of the door assembly 10.

The door latches 2 may be used to latch onto hooking pintles 4 connected to the door surrounding. For example, a single hooking shaft acting as a common sequence of hooking pintle 4 may be commonly coupled to a plurality of door latches 2, as exemplarily shown for the bottom side door latches 2. Such a single hooking shaft 4 may then be fixedly connected to the fuselage structure of the aircraft. Alternatively or additionally, there may be one hooking pintle 4 per door latch 2, as exemplarily shown for the side edge door latches 2. In this case, the hooking pintles 4 may be tubes or cylindrical tenons that protrude from the respective door frame edge into the door opening.

The number of hooking pintles 4 is only exemplarily shown as four, but there may be any other number of hooking pintles 4 provided, depending on application, size, weight and security level of the door assembly 10. The door latches 2 are generally semi-cylindrical in shape, i.e. they comprise a hollow cylinder member that is open to one side over an angular section of about 140° to 180°. The semi-cylindrical door latches 2 rotatably hook around the hooking pintles 4 with the open angular section facing towards the door body, thereby securing the door D from opening when outboard facing forces are exerted on the door. The door latches 2 may in particular be actuated by a common latch drive and may be designed to take outboard facing loads due to pressure differences between the inside and the outside of the aircraft. Each of the door latches 2 may also be individually lockable and each of the door latches 2 may be monitored by an individual latching/locking sensor monitoring the correct operation and proper latching/locking state of the associated door latch 2.

Of course, the door latches 2 and the hooking pintles 4 may be installed inversely, i.e. the hooking pintles 4 may be connected to the door body and the door latches 2 may be connected to the door frame. In that case, the mechanism for actuating the door latches 2 needs to be installed in the surrounding of the door, for example at the fuselage of an aircraft, while the hooking pintles 4 need to protrude from the edges of the door body to provide for the possibility of hooking engagement with the door latches 2.

Figure 2:
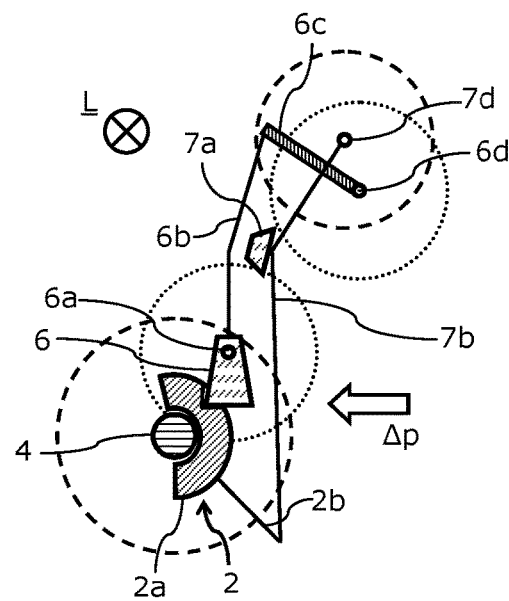
FIG. 2 schematically illustrates a side view of the latch and hook mechanism of an aircraft door assembly according to a further embodiment of the invention.

FIGS. 2 to 6 illustrate various degrees of detail of the latch and hook mechanism of the door assembly 10 provided by the door latches 2 and the hooking pintles 4. In FIGS. 2 to 6, the view is depicted as seen from the side, generally indicated by the reference sign "L" in FIG. 1 and in FIGS. 2 to 6. While FIG. 2 depicts a structural overview over the various mechanical components of the latch and hook mechanism of the door assembly 10, FIGS. 3 to 6 illustrate various operational stages of the latch and hook mechanism of the door assembly 10 during unlatching and unlocking of the door D.

Figure 6:
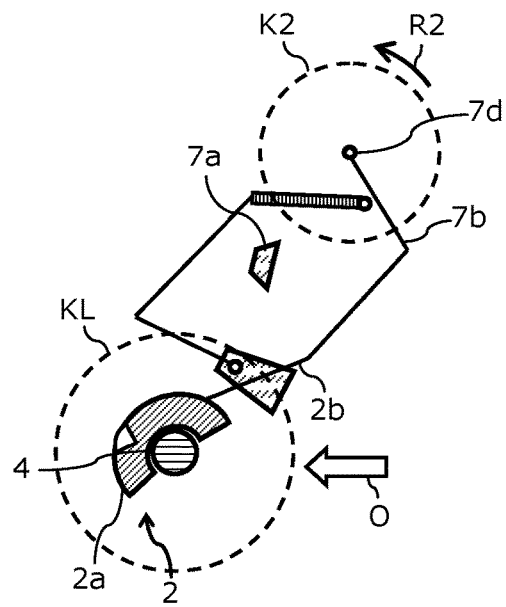
FIG. 6 schematically illustrates details of the side view of the latch and hook mechanism of FIG. 2 in an unlatched operational state according to a further embodiment of the invention.
Figure 7:
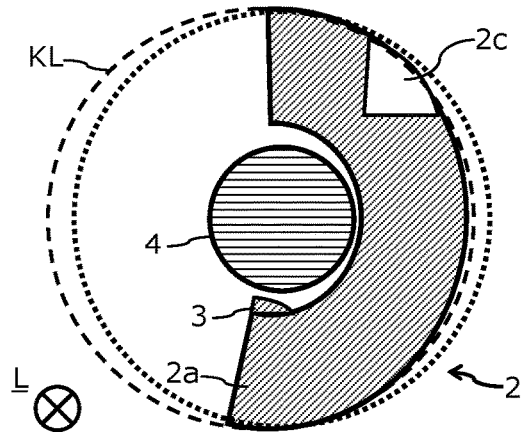
FIG. 7 schematically illustrates details of the side view of a further latch and hook mechanism of an aircraft door assembly in a latched operational state according to a further embodiment of the invention.
Figure 8:
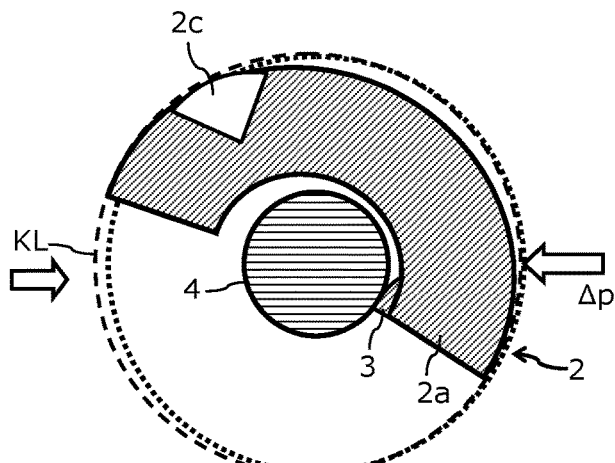
FIG. 8 schematically illustrates details of the side view of the latch and hook mechanism of FIG. 7 during an unlatching motion according to a further embodiment of the invention.

FIGS. 7 and 8, on the other hand, illustrate an alternative latch and hook mechanism of the door assembly 10 provided by the door latches 2 and the hooking pintles 4 in a latched operational state and during an unlatching motion, respectively. In contrast to the latch and hook mechanism as depicted in FIGS. 2 to 6, the latch and hook mechanism of FIGS. 7 and 8 includes an intrinsic overcenter mechanism that does not rely on an external kinematic linkage.

The door latch 2 includes a latch body 2a with a latch lever 2b attached thereto. The latch body 2a is generally C-shaped in a sense that the latch body 2a generally has the shape of a longitudinally cut-open hollow cylinder. The open side of the C-shape of the latch body 2a defines a semi-circular cavity which takes up and surrounds the hooking pintle 4. The angular section that is cut away from a full hollow cylinder to form the C-shape of the latch body 2a may for example be between 140° and 180°.

By pivoting the latch body 2a around its fulcrum which is substantially concentric with the axis of the hooking pintle 4, the door latch 2 is brought into hooking engagement with the hooking pintle 4 by means of the latch body 2a. In the locked state—as illustrated in FIG. 2—the hooking pintle 4 and the latch body 2a provide a stop against outboard facing forces, such as pressure-induced loads Δp. As shown in FIG. 2, the locked and latched operational state of the door latch 2 involves the latch body 2a being rotated around the hooking pintle 4 to have the open side of the C-shape to face in outboard direction, i.e. any pressure-induced loads Δp that act upon the door D in outboard direction press the C-shaped latch body 2a onto the hooking pintle 4, so that the door latch 2 prevents an outboard movement of the door D with respect to the hooking pintle 4 that is fixedly connected to the fuselage. The hooking pintle 4 is configured to catch the door latch 2 in hooking engagement, thereby retaining the door latch 2 in a direction perpendicular to the door body. In order to release the hooking engagement, the latch body 2a needs to be rotated counter clockwise until the open side of the C-shape of the latch body 2a no longer catches with the hooking pintle 4 in outboard direction.

The latch lever 2b is part of a linkage mechanism designed to hold the latch body 2a in its latched state. The latch lever 2b is fixedly connected to the latch body 2a and is configured to pivot together with the latch body 2a around a pivot axis in the center of the latch 2 which is substantially concentric with the axis of the hooking pintle 4. This pivot axis may either run parallel to the edge of the door body or the door frame to which the door latch 2 is secured (in the case of bottom side door latches 2) or perpendicular to the door edge (in the case of side edge door latches 2).

A latch linkage 7b hingedly connects the latch lever 2b to the door or the door frame. The latch linkage 7b may for example comprise a kinematic chain of a 2-bar linkage with a center joint. The latch linkage 7b forms a bistable linkage mechanism that has a release position, a deadcenter position and an opposite overcenter position. FIG. 2 displays the latch linkage 7b in its overcenter position in which the 2-bar linkage is overstretched over its center joint. A latch linkage stop member 7a may be fixedly connected to the door body or the door frame. The latch linkage stop member 7a provides a block against further lateral displacement of the center joint of the 2-bar linkage in the overcenter position.

The overcenter position of the bistable latch linkage 7b may be spring-actuated so that the rotating movement of the door latch 2 out of the hooking engagement with the hooking pintle 4 is blocked when a simple linear force in the direction normal to the door body is exerted in an outboard direction on the latch linkage 7b.

The door latch 2 may further comprise an arresting notch 2c that is formed off-center to the latch body 2a. The arresting notch 2c is formed in such a shape that a detent 6 with a detent pivot 6a may engage with the arresting notch 2c of the door latch 2 to keep the latch body 2a in a locked position. A detent linkage 6b may be fixedly connected to the detent 6, for example a kinematic chain of a 2-bar linkage with a center joint as well. The detent linkage 6b allows the detent 6 to be swivelled around the detent pivot 6a in and out of engagement with the arresting notch 2c of the latch body 2a. The detent linkage 6b may also comprise an overcenter mechanism where the locked position of the detent 6 is kept in place by bringing the detent linkage 6b into the (possibly spring-actuated) overcenter position. A force acting in outboard direction on the detent linkage 6b will therefore not be able to swivel the detent 6 out of its locking engagement with the arresting notch 2c.

Figure 3:
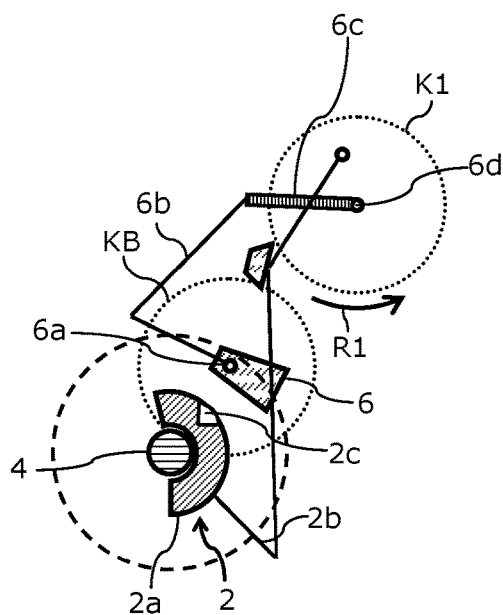
FIG. 3 schematically illustrates details of the side view of the latch and hook mechanism of FIG. 2 in an unlocked operational state according to a further embodiment of the invention.

FIG. 3 illustrates the operational state of the latch and hook mechanism in which the detent 6 is unlocked. To do so, the detent linkage 6b is moved out of its locking position, for example by pivoting a detent linkage lever 6c around a detent linkage lever fulcrum 6d with the detent linkage lever 6c following an unlocking motion R1 within the detent linkage range of motion K1. By translating the motion of the detent linkage lever 6c via the detent linkage 6b, the detent 6 pivots around the detent fulcrum 6a in a circular detent range of motion KB. After having been pivoted, the detent 6 is moved completely out of the arresting notch 2c and thus no longer blocks movement of the door latch 2.

Figure 4:
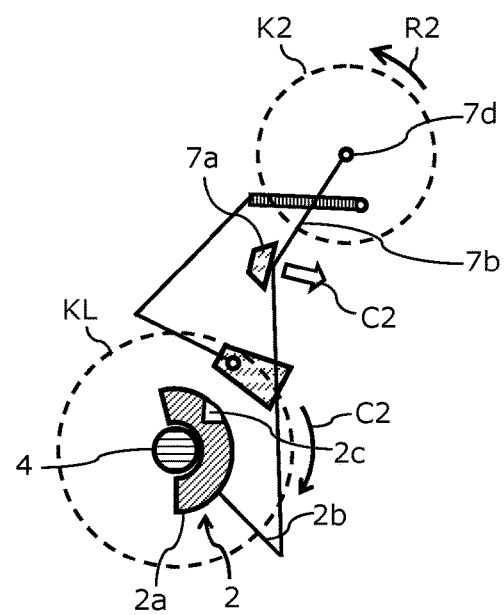
FIG. 4 schematically illustrates details of the side view of the latch and hook mechanism of FIG. 2 in an unlocked operational state according to a further embodiment of the invention.

FIG. 4 illustrates the operational state of the latch and hook mechanism after the detent 6 has been unlocked. In order to unlatch the door latch 2, the latch linkage 7b needs to be actuated in an unlatching motion R2 within a range of motion K2 around a latch linkage fulcrum 7d at which the end joint opposite to the joint where the latch linkage 7b is connected to the latch lever 2b is pivotably fixed. The turning unlocking motion R2 forces the center joint that has previously rested against the latch linkage stop member 7a in its first stable overcenter position into a tipping motion C2. This tipping motion C2 moves the latch linkage 7b out of its overcenter position towards the deadcenter position of the bistable mechanism. By virtue of the tipping motion C2, the latch lever 2b is at first pushed downwards (or clockwise) into deeper hooking engagement with the hooking pintle 4 as indicated by the arrow and the reference sign "C2" at the latch shaft 4.

Figure 5:
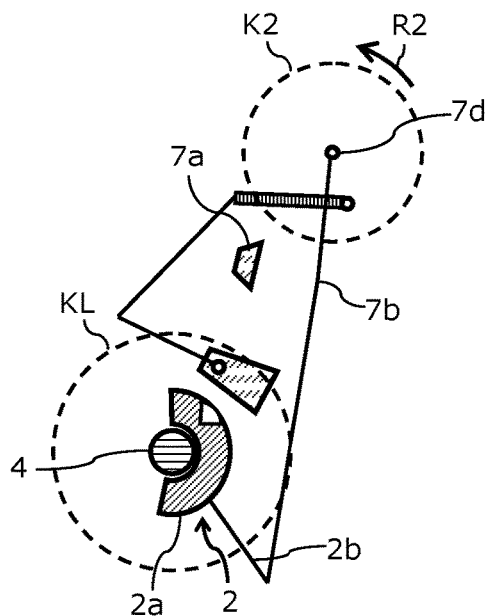
FIG. 5 schematically illustrates details of the side view of the latch and hook mechanism of FIG. 2 during an unlatching motion according to a further embodiment of the invention.

FIG. 5 illustrates the operational state of the latch and hook mechanism after the latch linkage 7b has been moved out of its overcenter position into the deadcenter position. In the deadcenter position, the 2-bar is fully linearly stretched and the lever 2b is pushed to a maximum into the hooking engagement with the hooking pintle 4. After this initial movement of the latch linkage 7b in a direction opposite to the normally acting pressure-induced loads, the door latch 2 may then be easily rotated out of the hooking engagement with the hooking pintle 4 by further following the unlatching motion R2 within the latch range of motion KL. As depicted in FIG. 6, the latch and hook mechanism may be released by tilting the latch linkage 7b into its second stable release position. Once the latch body 2a has been rotated far enough in a counter clockwise direction, the open angular section of the C-shape of the latch body 2a at partially faces towards the inside of the aircraft, and the door D may be opened in an opening motion O. This opening motion O may for example be performed under power-assistance, for example by a motor or a hydraulic, pneumatic and/or electric drive mechanism. The door D may then swing open, for example around the hinge at the top edge of the door.

FIGS. 7 and 8 illustrate different or alternative constructions for an overcentered actuation mechanism of the door latches 2 with respect to the hooking pintles 4. FIG. 7 illustrates details of the side view in viewing direction L of the latch body 2a and the hooking pintle 4 of an aircraft door assembly in a latched operational state.

Instead of a linkage mechanism with a latch lever 2b and a latch linkage 7b as described and explained in conjunction with FIGS. 2 to 6, the door latch 2 of FIG. 7 comprises a pawl 3 coupled to the latch body 2a at one side of the C-shape. The pawl 3 may for example be a separate member attached to the latch body 2a or may be integrally formed with the latch body 2a. The shape of the pawl 3 is generally not restricted to the knob-like structure as exemplarily shown in FIGS. 7 and 8, but may instead take on any outer shape that provides similar functionality as the pawl 3 in FIGS. 7 and 8.

The pawl 3 provides an inherent overcentered ratcheting mechanism for the latch body 2a when rotated around the hooking pintle 4. The latch range of motion KL shown dashed in FIGS. 7 and 8 is laterally displaced with respect to the center of the hooking pintle 4. In order to better illustrate this lateral displacement, a circle of similar extent is shown in dotted lines around the center of the hooking pintle 4 in FIGS. 7 and 8.

In the latched (and possibly locked) operational state of the door latch 2, the pawl 3 is relatively far away from the surface of the hooking pintle 4. However, on rotating the latch body 2a counter clockwise, the pawl 3 will be pushed into contact with the surface of the hooking pintle 4, thereby exerting a countering force to the torsional force causing the rotational movement. When the door latch 2 is mounted with a certain degree of flexibility, the countering force exerted by the pawl 3 in contact with the hooking pintle 4, the latch range of motion KL will be displaced inwardly, thus causing a lateral movement of the door latch 2 towards the inside of the aircraft, i.e. in the opposite direction of any pressure-induced loads that usually act in outboard direction.

Therefore, the pawl 3 provides for an overcentered actuation mechanism with the latched operational state in FIG. 7 being the overcentered stable position of the latch body 2a and the inwardly displaced intermediate operational state in FIG. 8 being the deadcenter position. Once the latch body 2a is rotated further in counter clockwise direction, the pawl 3 disengages from the surface of the hooking pintle 4 again and causes the countering force to be released. In the second stable position of the latch body 2a where the open angular section of the C-shaped latch body 2a faces inwardly, the door latch 2 is unlatched from the hooking pintle 4 and may be release in an outboard facing opening movement.

The latch and hook mechanism of FIGS. 7 and 8 provides for a self-centering mechanism that secures the door latch 2 against any outboard forces such as pressure-induced loads that act on the door D once the latch body 2a has been fully engaged in the overcenter position. The unlatching of the door D may only occur upon rotating the latch body 2a against the countering force of the pawl 3 pressing against the hooking pintle 4.

Figure 9:
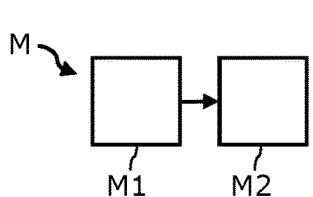
FIG. 9 schematically illustrates stages of a method for operating an aircraft door assembly according to another embodiment of the invention.

FIG. 9 schematically illustrates stages of a method M for operating a door assembly, for example a door assembly 10 as explained in conjunction with FIGS. 1 to 6. The method M may be specifically used for operating door assemblies 10 on board of an aircraft, such as the aircraft 20 as depicted in FIG. 10.

In a first stage M1, the method M involves rotating the latch body 2a from the overcenter position of the bistable latch and hook mechanism to a deadcenter position of the bistable latch and hook mechanism around the hooking pintle 4. This means that the latch body 2a is at first rotated clockwise over a small angular distance, until the latch lever 2b is fully stretched in the deadcenter position, as illustrated in FIG. 5. This pushes the latch body 2a in at least partially deeper hooking engagement with the hooking pintle 4. Then, in a second stage M2, the method M involves rotating the latch body 2a over the deadcenter position in the opposite direction around the hooking pintle 4. Since the latch linkage 7b allows releasing movement of the latch lever 2b, the latch body 2a is able to freely rotate counter clockwise again, until the hooking engagement with the hooking pintle 4 in outboard direction is released.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door assembly, comprising:
   a door frame;
   a door having a door body hingedly installed in the door frame;
   at least one hooking pintle attached to the door frame or an edge of the door body extending along a pintle axis;
   at least one door latch connected to the edge of the door body or the door frame, respectively, the at least one door latch having a substantially C-shaped latch body configured to rotate around an axis parallel to the pintle axis of the at least one hooking pintle; and
   a bistable latch and hook mechanism configured to catch the at least one door latch in hooking engagement with the at least one hooking pintle,
   wherein the at least one door latch further comprises an arresting notch formed off-center to the C-shaped latch body.

2. The door assembly of claim 1, wherein the bistable latch and hook mechanism comprises:
   a latch lever fixedly connected to the C-shaped latch body and protruding outwardly from the C-shaped latch body; and
   a bistable latch linkage hingedly connecting the latch lever to the door body or the door frame, the bistable latch linkage having a spring-actuated overcenter position in which the at least one door latch is biased in hooking engagement with the at least one hooking pintle.

3. The door assembly of claim 2, wherein the latch linkage comprises a kinematic chain of a 2-bar linkage with a center joint.

4. The door assembly of claim 3, further comprising:
   a latch linkage stop member fixedly connected to the door body or the door frame and configured to unidirectionally block the center joint of the 2-bar linkage in an overcenter position.

5. The door assembly of claim 4, wherein the latch linkage stop member is configured to unidirectionally block the center joint of the 2-bar linkage.

6. The door assembly of claim 1, wherein the C-shaped latch body is configured to rotate around an axis that is laterally displaced with respect to the pintle axis of the at least one hooking pintle and to laterally shift towards the pintle axis of the at least one hooking pintle when rotating out of an overcenter position.

7. The door assembly of claim 6, wherein the bistable latch and hook mechanism comprises:
   a pawl attached to and protruding outwardly from an inner surface of the C-shaped latch body facing towards the at least one hooking pintle.

8. The door assembly of claim 7, wherein the pawl is integrally formed with the C-shaped latch body.

9. The door assembly of claim 1, further comprising:
   a detent having a detent pivot engaging with the arresting notch of the at least one door latch in a locked position.

10. The door assembly of claim 9, further comprising:
    a detent linkage fixedly connected to the detent and configured to swivel the detent pivot in and out of engagement with the arresting notch of the at least one door latch.

11. The door assembly of claim 10, wherein the detent linkage comprises a kinematic chain of a 2-bar linkage with a centre joint.

12. An aircraft, comprising an aircraft door with a door assembly, the door assembly comprising:
    a door frame;
    a door having a door body hingedly installed in the door frame;

at least one hooking pintle attached to the door frame or an edge of the door body extending along a pintle axis;

at least one door latch connected to the edge of the door body or the door frame, respectively, the at least one door latch having a substantially C-shaped latch body configured to rotate around an axis parallel to the pintle axis of the at least one hooking pintle; and a bistable latch and hook mechanism configured to catch the at least one door latch in hooking engagement with the at least one hooking pintle; and a monitoring system connected to the door assembly and configured to prevent ventilation of pressurization of the aircraft depending on the operational state of the door assembly.

13. The aircraft of claim 12, wherein the aircraft door is an overwing exit.

14. A method for operating a door assembly, the door assembly comprising:

a door frame;

a door having a door body hingedly installed in the door frame;

at least one hooking pintle attached to the door frame or an edge of the door body extending along a pintle axis;

at least one door latch connected to the edge of the door body or the door frame, respectively, the at least one door latch having a substantially C-shaped latch body configured to rotate around an axis parallel to the pintle axis of the at least one hooking pintle; and a bistable latch and hook mechanism configured to catch the at least one door latch in hooking engagement with the at least one hooking pintle, wherein the at least one door latch further comprises an arresting notch formed off-center to the C-shaped latch body, the method comprising:

rotating the C-shaped latch body from an overcenter position of the bistable latch and hook mechanism to a deadcenter position of the bistable latch and hook mechanism around the at least one hooking pintle in at least partially deeper hooking engagement with the at least one hooking pintle; and rotating the C-shaped latch body over the deadcenter position in the opposite direction around the at least one hooking pintle out of the hooking engagement with the at least one hooking pintle.

* * * * *